United States Patent
Lebedev et al.

(10) Patent No.: US 11,968,185 B2
(45) Date of Patent: Apr. 23, 2024

(54) ON-DEVICE EXPERIMENTATION

(71) Applicant: Microsoft Technology Licensing, LLC, Redmond, WA (US)

(72) Inventors: Kirill S. Lebedev, Novato, CA (US); Elise Georis, San Francisco, CA (US); Xiaoxu Wu, Sunnyvale, CA (US); Alex S. Kaufman, San Francisco, CA (US); Jialiang Mao, Arlington, VA (US); Wanjun Liu, Mishawaka, IN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 267 days.

(21) Appl. No.: 17/681,343

(22) Filed: Feb. 25, 2022

(65) Prior Publication Data

US 2023/0275876 A1    Aug. 31, 2023

(51) Int. Cl.
   *H04L 9/40* (2022.01)
(52) U.S. Cl.
   CPC .................... *H04L 63/0421* (2013.01)
(58) Field of Classification Search
   CPC . H04L 63/0421; H04L 63/0414; H04L 63/04; H04L 67/535; G06F 21/6254; G06F 11/3438; H04W 12/02; H04W 4/08
   See application file for complete search history.

(56) References Cited

U.S. PATENT DOCUMENTS

| | | | |
|---|---|---|---|
| 2010/0094758 A1 | 4/2010 | Chamberlain | |
| 2017/0371925 A1 | 12/2017 | Arya | |
| 2022/0303761 A1* | 9/2022 | Mohan | H04W 12/63 |
| 2022/0318830 A1* | 10/2022 | Liu | G06Q 30/02 |
| 2022/0366299 A1 | 11/2022 | Sinha | |
| 2023/0123539 A1* | 4/2023 | Paulsen | G06F 16/9535 707/752 |

(Continued)

OTHER PUBLICATIONS

Kedacic et al., "Application for Testing of Video and Subtitle Synchronization," 2018 International Conference on Smart Systems and Technologies (SST) Year: 2018 | Conference Paper | Publisher: IEEE.*

(Continued)

*Primary Examiner* — Roderick Tolentino
(74) *Attorney, Agent, or Firm* — NICHOLSON DE VOS WEBSTER & ELLIOTT LLP

(57) ABSTRACT

Technologies for on-device experimentation include embodiments that receive a request to provide digital content for display in a slot of a user interface display screen of a first device. By a secure execution environment, an identifier received with the request is anonymized. The request is determined to be associated with a content distribution test. The anonymized identifier is assigned to a test group associated with the content distribution test. The secure execution environment receives user interface event data generated by the first device in response to the content distribution test. The received user interface event data is attributed to the test group. An association of the user interface event data with the test group and the content distribution test is provided by the secure execution environment to a second device different than the first device while the identifier and the anonymized identifier are not provided to the second device.

20 Claims, 8 Drawing Sheets

(56) References Cited

U.S. PATENT DOCUMENTS

| | | | | |
|---|---|---|---|---|
| 2023/0239134 | A1* | 7/2023 | Salomon | H04L 9/0894 |
| | | | | 713/165 |
| 2023/0269411 | A1* | 8/2023 | Senokuchi | H04N 21/266 |
| 2023/0297857 | A1* | 9/2023 | Melamed | G06N 20/00 |
| | | | | 706/12 |
| 2023/0306473 | A1* | 9/2023 | Wang | G06Q 30/0251 |
| 2023/0315818 | A1* | 10/2023 | Gould | G06Q 30/0248 |
| | | | | 705/14.47 |
| 2023/0334021 | A1* | 10/2023 | Brechbuhl | G06F 16/176 |
| 2023/0351464 | A1* | 11/2023 | Beausoleil | G06Q 30/0611 |

OTHER PUBLICATIONS

Schneider et al., "The Use of Social News Curation to Empower Citizens and Journalists: Findings of a Focus Group Study with Professional Curators," 2021 IEEE 24th International Conference on Computer Supported Cooperative Work in Design (CSCWD) Year: 2021 | Conference Paper | Publisher: IEEE.*

"Objective-Collapse Theory", Retrieved from: https://web.archive.org/web/20220407194925/https://en.wikipedia.org/wiki/Objective-collapse_theory, Feb. 23, 2022, 9 Pages.

"Superposition Principle", Retrieved from: https://web.archive.org/web/20220417011530/https://en.wikipedia.org/wiki/Superposition_principle, Mar. 11, 2022, 8 Pages.

"Learning with Privacy at Scale", Retrieved From: https://machinelearning.apple.com/research/learning-with-privacy-at-scale, Dec. 2017, 25 Pages.

Warner, Stanleyl., "Randomized response: A survey technique for eliminating evasive answer bias", In Journal of the American Statistical Association, vol. 60, No. 309, Mar. 1965, 8 Pages.

Wang, et al., "Using randomized response for differential privacy preserving data collection", In Proceedings of the Workshops of the EDBT/ICDT Joint Conference, Mar. 15, 2016, 8 Pages.

Mudd, Graham., "Privacy-Enhancing Technologies and Building for the Future", Retrieved from: https://www.facebook.com/business/news/building-for-the-future, Aug. 11, 2021, 7 Pages.

Johnson, et al., "FBPCF (Facebook Private Computation Framework)", Retrieved From : https://github.com/facebookresearch/fbpcf?fbclid=IwAR18czH0YDeyS3qdJBUMzT38KMAIGSXUL4elwqWiQZv2Ub9FtAZI7zlogk8, Retrieved Date: Jan. 10, 2022, 11 Pages.

U.S. Appl. No. 17/709,318, filed Mar. 30, 2022.

Non-Final Office Action mailed on Jan. 19, 2024, in U.S. Appl. No. 17/972,408, 13 pages.

* cited by examiner

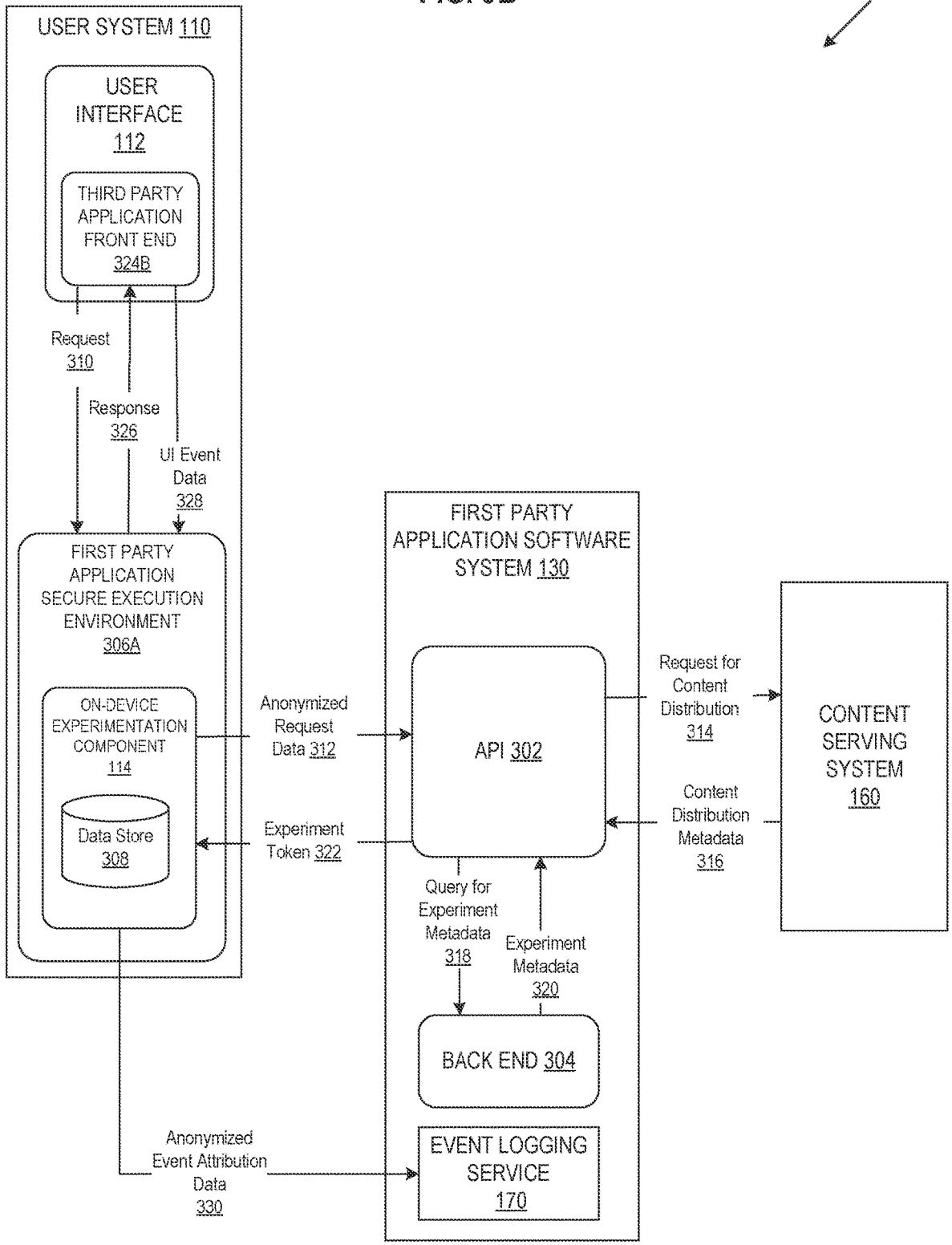

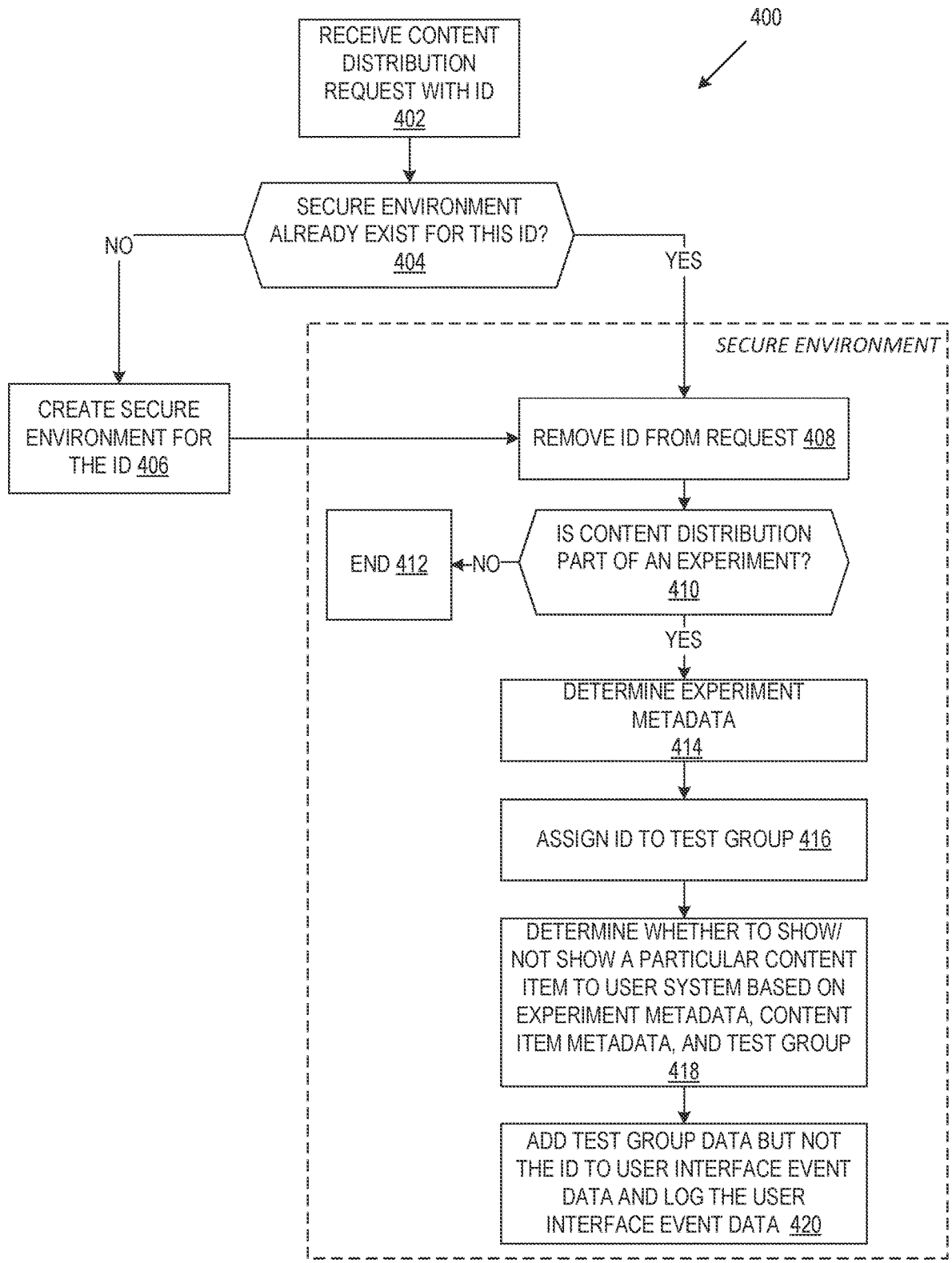

ON-DEVICE EXPERIMENTATION

TECHNICAL FIELD

A technical field to which the present disclosure relates is the use of experimentation to measure the performance of digital content distribution systems. Another technical field to which the present disclosure relates is data security.

BACKGROUND

Software applications use computer networks to distribute digital content to user computing devices. The performance of a digital content distribution system can be measured based on signals generated at the user device, such as clicks, conversions, and other user interface events. Often, multiple different digital content distribution applications are installed on or accessible to a particular user system. For example, at any given time, a particular user may have multiple different content distribution apps of different providers installed on their smart phone.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3B is a flow diagram of an example method 300B to implement on-device experimentation in accordance with some embodiments of the present disclosure.

FIG. 4 is a flow diagram of an example method 400 for on-device experimentation in accordance with some embodiments of the present disclosure.

DETAILED DESCRIPTION

Figure 1:
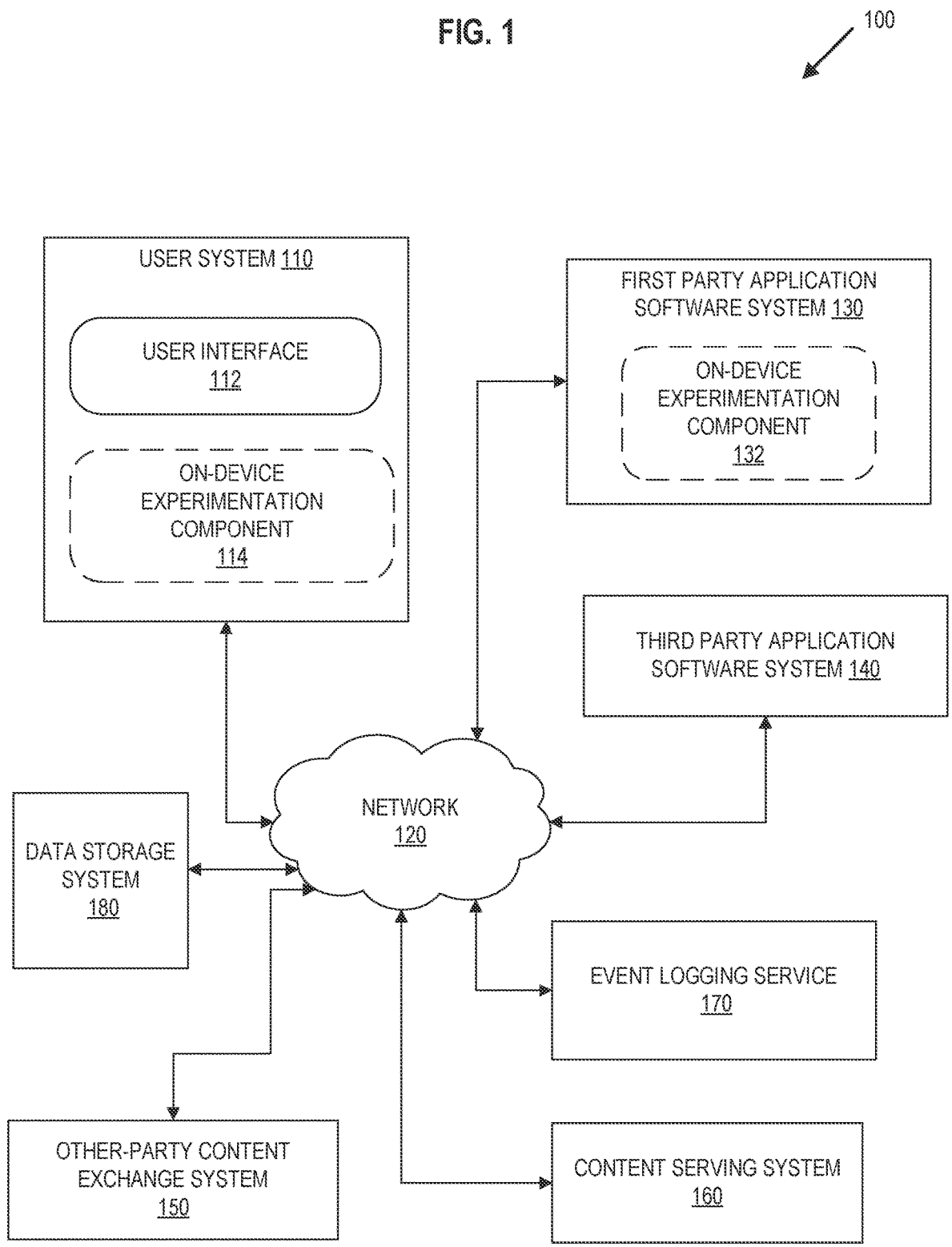
FIG. 1 illustrates an example computing system 100 that includes an on-device experimentation component in accordance with some embodiments of the present disclosure.

Aspects of the present disclosure are directed to providing a secure environment in which to both conduct content distribution tests and provide data security for data collected during content distribution tests.

Any network-based application software system can act as a content distribution system. For example, news and entertainment apps installed on mobile devices, messaging systems, and social graph-based applications can all function as content distribution systems. Providers of content distribution systems can measure the systems' performance by conducting experiments, which may be referred to as content distribution tests. Examples of content distribution tests include A/B tests and lift tests. In an A/B test, generally, a population of users is divided into two mutually exclusive groups. In some A/B tests, the two groups each receive a different variant of a digital content item. In other A/B tests, the two groups themselves are different and both groups receive the same variant rather than different variants. User interface events that are signals of user feedback on the received variant are aggregated across each of the groups. The aggregated feedback signals are compared across the groups to generate performance metrics for the content distribution system. The performance metrics are monitored over a time interval that determines the duration of the content distribution test.

In a lift test, generally, the population of users is divided into two mutually exclusive groups. One of the groups receives a particular digital content item that are part of the lift test and the other group does not receive any digital content items that are part of the lift test. In some types of lift tests, the user feedback signals that are collected include user interface events that are responsive to a survey or questionnaire. In other lift tests, the user feedback signals that are collected include user interface events that are responsive to multiple different digital content items, such as an article and a follow-up survey.

Performance measurements can help improve the usability and effectiveness of content distribution systems for both the end users and the providers of digital content items. For instance, performance measurements can be used as or converted to features for training and/or fine tuning of a machine learning model of a content serving pipeline, or for improving an automated process of selecting content items for distribution. The machine learning model may directly or indirectly control the downstream flow of digital content items to user devices. Thus, the quality of the performance measurements can determine the control of the downstream flow.

Performance measurements need to be accurate and reliable in order to be useful as training data, content selection signals, or otherwise. In the context of content distribution tests, generally, the accuracy and reliability of performance measurements depends on the mutual exclusivity of the test groups. Thus, if a particular content distribution test has defined two test groups A and B and a user 1 is assigned to a test group A, an experimentation system that runs the test needs to ensure that user 1 is always assigned to test group A and is not assigned to test group B at any time during the duration of the test.

The duration of a content distribution test often spans multiple different login sessions of a particular user. Thus, the experimentation system needs to ensure that (1) it recognizes the different login sessions as being associated with the same user, and (2) consistently assigns user feedback signals from that user to the user's assigned test group.

On the other hand, data security rules and/or protocols often restrict access to unique user identifiers and/or user feedback signals. For example, a unique user identifier used by one device or system might not be permitted to be shared with other-party devices or systems. As another example, an experimentation system might not be permitted to uniquely identify a particular user from an aggregate data set of user feedback signals, nor to share individually identifiable user feedback signals with other-party devices or systems.

Some prior experimentation systems may satisfy the consistency requirements of a content distribution test but with a risk that a data security constraint might be violated in some instances. Other prior systems may satisfy the data security constraints but without being able to ensure that the consistency requirements of a particular test are met. For example, data security requirements might be satisfied by replacing a user identifier with an anonymized group identifier. However, group identifiers are not stable over time. As such, group identifiers cannot ensure that the same user is consistently assigned to the same test group across multiple login sessions.

Thus, a technical challenge is for experimentation systems to implement and enforce applicable data security requirements while also ensuring consistency and reliability within the execution of content distribution tests and the resulting performance measurements.

Aspects of the present disclosure address the above and other deficiencies by implementing an experimentation system as an on-device experimentation component. Embodiments of the on-device experimentation component protect identifiers in a secure environment and run components of content distribution tests from within the secure environment. For example, some embodiments run both a randomization component and an attribution component in the secure environment. In this way, embodiments are capable of ensuring that protected identifiers are not shared with other-party application systems while also ensuring that user feedback signals collected during content distribution tests are anonymized and consistently attributed to the assigned test groups.

The disclosed technologies are described with reference to experimentation in the context of online network-based digital content distribution. An example of a content distribution use case is the testing of digital advertisements for products and/or services. However, aspects of the disclosed technologies are not limited to ads experimentation, but can be used to improve content distribution tests more generally.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes an on-device experimentation component in accordance with some embodiments of the present disclosure.

In the embodiment of FIG. 1, computing system 100 includes a user system 110, a network 120, a first party application software system 130, a third party application software system 140, an other-party content exchange system 150, a content serving system 160, an event logging service 170, and a data storage system 180.

As described in more detail below, on-device experimentation component 114, 132 run portions of an experiment system in a secure environment that isolates sensitive information such as unique identifiers and/or user interface event data to prevent leaking to unauthorized applications, systems, or devices. In some configurations, on-device experimentation component 114 resides locally on user system 110. In other configurations, on-device experimentation component 132 resides on first party application software system 130. Whether on-device experimentation component 114 or on-device experimentation component 132 is employed in a given instance is dependent upon the configuration of third party application software system 140 and/or the configuration of first party application software system 130. In some embodiments, on-device experimentation component 114, 132 is implemented as a software library that is executed in an ephemeral instance of a secure environment.

User system 110 includes at least one computing device, such as a personal computing device, a server, a mobile computing device, or a smart appliance. User system 110 includes at least one software application, including a user interface 112, installed on or accessible by a network to a computing device. In some embodiments, user interface 112 is or includes a front-end portion of first party application software system 130 and/or a front-end portion of third party application software system 140. For example, embodiments of user interface 112 include a graphical display screen that includes one or more slots. A slot as used herein refers to a space on a graphical display such as a web page or mobile device screen, into which digital content may be loaded during a content distribution. The locations and dimensions of a particular slot on a screen are specified using, for example, a markup language such as HTML (Hypertext Markup Language). On a typical display screen, a slot is defined by two-dimensional coordinates; however, in a virtual reality or augmented reality implementation, a slot may be defined using a three-dimensional coordinate system.

User interface 112 is any type of user interface as described above. User interface 112 can be used to input search queries and view or otherwise perceive output that includes data produced by first party application software system 130 or third party application software system 140. For example, user interface 112 can include a graphical user interface and/or a conversational voice/speech interface that includes a mechanism for entering a search query and viewing query results and/or other digital content. Examples of user interface 112 include web browsers, command line interfaces, and mobile apps. User interface 112 as used herein can include application programming interfaces (APIs).

First party application software system 130 is any type of application software system that provides or enables at least one form of digital content distribution to user systems such as user system 110. Examples of first party application software system 130 include but are not limited to connections network software, such as social media platforms, and systems that are or are not be based on connections network software, such as general-purpose search engines, job search software, recruiter search software, sales assistance software, content distribution software, learning and education software, or any combination of any of the foregoing.

First party application as used herein may refer to a software application that is considered the owner of particular data or that has been granted permission by a user to use certain data. For example, an application that requires users to agree to a set of terms and conditions regarding data security may be considered a first party application with respect to data created as a result of the users' use of the first party application.

Third party application software system 140 is any type of application software system that provides or enables at least one form of digital content distribution to user systems. Examples of third party application software system 140 include but are not limited to any type of networked software application including mobile apps such as social media platforms, news and entertainment apps, messaging apps, search engines, or any combination of any of the foregoing.

Third party application as used herein may refer to a software application that is different than first party application 130 in terms of its publisher, platform, or other considerations. A third party application may refer to a software application that is considered the owner of particular data or that has been granted permission by a user to use certain data, which is not the first party application 130. For example, an application that requires users to agree to a set of terms and conditions regarding data security may be considered a third party application with respect to data created as a result of the users' use of the third party application. Certain data owned or used by a third party application 140 is not owned by the first party application 130 and the first party application 130 may not have been granted permission to use that data.

Other-party content exchange system 150 is a technology platform that facilitates access to digital content items across multiple different application, systems, or networks. For example, a third party application system 140 may send a content distribution request to other-party content exchange system 150, and the other-party content exchange system 150 may forward the request to multiple different application software systems including first party application software system 130. In some embodiments, other-party content exchange system 150 is owned or managed by a different entity than third party application system 140 and first party application software system 130. In other embodiments, portions of other-party content exchange system 150 may be owned or managed by third party application system 140 or first party application software system 130.

Content serving system 160 is a data storage service, such as a web server, which stores digital content items that may be included in a content distribution. In some embodiments, content serving system 160 processes content distribution requests from, for example, first party application software system 130, third party application system 140, or other-party content exchange system 150, and distributes digital content items to user systems 110 in response to requests. For example, content serving system 160 delivers digital content items to web sites and mobile apps or to particular slots of web sites or mobile app user interface display screens.

Event logging service 170 captures user interface events such as page loads and clicks in real time, and formulates the user interface events into a data stream that can be consumed by, for example, a stream processing system. For example, when a user of first party application system 130 or third party application system 140 clicks on a user interface control such as view, comment, share, like, or loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.). Event logging service 170 generates a data stream that includes one record of real-time event data for each user interface event that has occurred. Event logging service 170 is implemented using APACHE KAFKA in some embodiments.

"Time" as used in the context of terminology such as real-time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes.

Data storage system 180 includes data stores and/or data services that store digital content items, data received, used, manipulated, and produced by first party application software system 130 and/or third party application system 140. Alternatively or in addition, data storage system 180 includes data stores and/or data services that store data received, used, manipulated, and produced by on-device experimentation component 114, 132, such as anonymized user interface event data that has been attributed by on-device experimentation component 114, 132 to a test group of a content distribution test, aggregated user interface event data, and/or performance measurements computed based on data provided by on-device experimentation component 114, 132. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, first party application software system 130, third party application software system 140, other-party content exchange system 150, content serving system 160, event logging service 170, and data storage system 180 includes an interface embodied as computer programming code stored in computer memory that when executed causes a computing device to enable bidirectional communication with any other of user system 110, first party application software system 130, third party application software system 140, other-party content exchange system 150, content serving system 160, event logging service 170, and data storage system 180 using a communicative coupling mechanism. Examples of communicative coupling mechanisms include network interfaces, inter-process communication (IPC) interfaces and application program interfaces (APIs).

A client portion of first party application software system 130 and/or third party application software system 140 can operate in user system 110, for example as a plugin or widget in a graphical user interface of a software application or as a web browser executing user interface 112. In an embodiment, a web browser can transmit an HTTP request over a network (e.g., the Internet) in response to user input that is received through a user interface provided by the web application and displayed through the web browser. A server running first party application software system 130 and/or a server portion of first party application software system 130 can receive the input, perform at least one operation using the input, and return output using an HTTP response that the web browser receives and processes.

Each of user system 110, first party application software system 130, third party application software system 140, other-party content exchange system 150, content serving system 160, event logging service 170, and data storage system 180 is implemented using at least one computing device that is communicatively coupled to electronic communications network 120. Any of user system 110, first party application software system 130, third party application software system 140, other-party content exchange system 150, content serving system 160, event logging service 170, and data storage system 180 can be bidirectionally communicatively coupled by network 120. User system 110 as well as one or more different user systems (not shown) can be bidirectionally communicatively coupled to first party application software system 130.

A typical user of user system 110 can be an administrator or end user of first party application software system 130, third party application software system 140, other-party content exchange system 150, and/or content serving system 160. User system 110 is configured to communicate bidirectionally with any of first party application software system 130, third party application software system 140, other-party content exchange system 150, and/or content serving system 160 over network 120.

The features and functionality of user system 110, first party application software system 130, third party application software system 140, other-party content exchange system 150, content serving system 160, event logging service 170, and data storage system 180 are implemented using computer software, hardware, or software and hardware, and can include combinations of automated functionality, data structures, and digital data, which are represented schematically in the figures. User system 110, first party application software system 130, third party application software system 140, other-party content exchange system 150, content serving system 160, event logging service 170, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

The computing system 110 includes on-device experimentation component 114, 132. In some embodiments, the first party application software system 130 is considered as including at least a portion of the on-device experimentation component 114, 132, although the on-device experimentation component 114, 132 may not be considered as owned by the first party application software system 130. For example, the on-device experimentation component 114, 132 may be considered owned by the particular entity that initiates a content distribution request, e.g., a particular user system 110. As such, in some embodiments, on-device experimentation component 114, 132 may operate as a proxy for a content serving system 160 handling a content distribution request and associated response.

Figure 6:
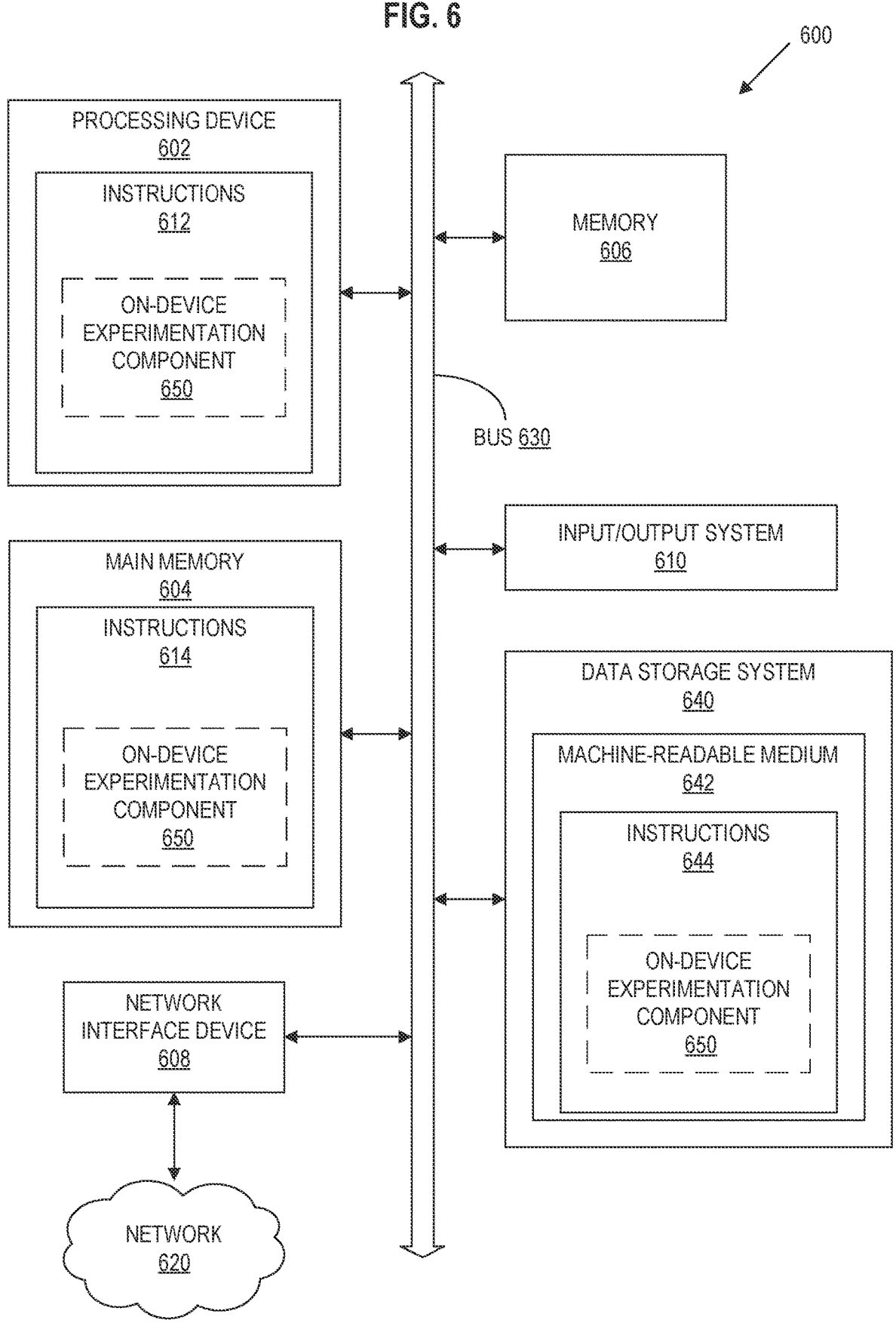
FIG. 6 is a block diagram of an example computer system in which embodiments of the present disclosure can operate.

For ease of discussion, in FIG. 6, the on-device experimentation component 114, 132 is represented as on-device experimentation component 650. On-device experimentation component 650 is implemented as instructions stored in a memory, and a processing device 602 can be configured to execute the instructions stored in the memory to perform the operations described herein.

The disclosed technologies can be described with reference to an example use case of digital content distribution involving a social graph-based application such as a professional social network application. The disclosed technologies are not limited to use in connection with social graph applications but can be used to provide data security for content distribution experimentation systems more generally. The disclosed technologies can be employed by many different types of network-based applications in which content distribution experimentation is used, including but not limited to various types and forms of application software systems. For example, the disclosed technologies are applicable to many different experimentation contexts including but not limited to A/B testing and various forms of lift testing.

Further details with regard to the operations of the on-device experimentation component 114, 132 are described below.

Figure 2:
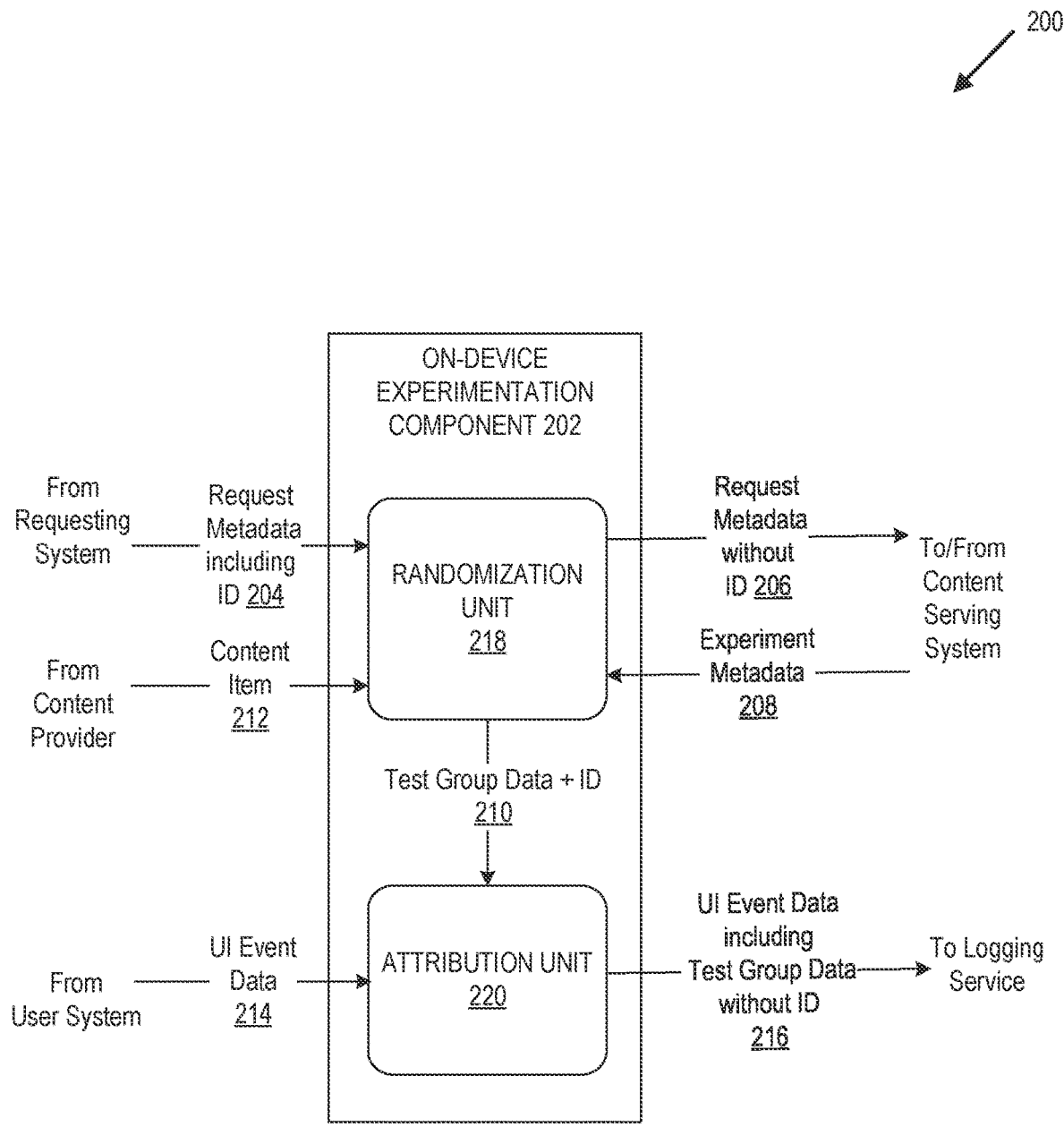
FIG. 2 is a flow diagram of an example method 200 for on-device experimentation in accordance with some embodiments of the present disclosure.

FIG. 2 is a flow diagram of an example method 200 for on-device experimentation in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the on-device experimentation component 114, 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 2 illustrates an embodiment of on-device experimentation component 114, 132 which is represented as on-device experimentation component 202 for ease of discussion. In operation, on-device experimentation component 114, 132 runs in a secure execution environment, either locally at the user system or on the server side of a first party application software system. On-device experimentation component 202 includes a randomization unit 218 and an attribution unit 220. Randomization unit 218 receives content distribution requests from requesting systems outside of on-device experimentation component 202. A content distribution request is, for example, a network message such as an HTTP (HyperText Transfer Protocol) request for data, such as a page load.

Content distribution requests received by randomization unit 218 include request metadata, including an identifier (ID) 204 that may uniquely identify the source of the request (e.g., a user account identifier, a device identifier, a session identifier, etc.). Randomization unit 218 receives the request, anonymizes the request by removing the identifier from the request metadata, and sends the request metadata without the identifier 206 to a content serving system. If the request is associated with an experiment, such as an A/B test or a lift test, the content serving system returns experiment metadata 208 to randomization unit 218.

Based on the experiment metadata 208, randomization unit 218 assigns the ID 204 to a test group associated with the experiment. For example, randomization unit 218 randomly assigns the ID to a treatment test group or to a control test group using, e.g., a random function. On-device experimentation component 202 stores the ID to test group mapping created by randomization unit 218 in a secure data store of on-device experimentation component 202.

In some embodiments, when randomization unit 218 determines based on the experiment metadata 208 that the test type is a lift test, randomization unit 218 creates, in a data store of the secure execution environment, a space-efficient probabilistic data structure such as a bloom filter-based cache and uses the cache to store multiple different digital content items or links to those digital content items.

When a digital content item 212 is received at on-device experimentation component 202, e.g., from a content provider, randomization unit 218 determines whether or not to display the content item to the user associated with the request based on the test group assignment made by randomization unit 218 and, in some embodiments, based on experiment metadata appended to the content item. Because randomization is performed within on-device experimentation component 202, information about the ID, the test group assignment, and whether or not a particular content item is shown to the user are all maintained within on-device experimentation component 202.

Test group data 210 indicates the test group assigned to the ID associated with the request but does not include the ID 204. Test group data 210 is provided to attribution unit 220. When a content item 212 is shown to the user associated with the request, the associated user system generates user interface (UI) event data 214 which acts as a signal of user feedback in response to the display of the content item. Attribution unit 220 matches the UI event data 214 with test group data 210 and annotates the UI event data 214 with the test group data 210. Attribution unit 220 forwards the UI event data including the test group data 216 to a logging service. At the logging service or as part of a subsequent downstream operation, the UI event data annotated with the test group data 216 is aggregated, e.g., across all login sessions over a time interval, and used to compute performance measurements for the content distribution system based on the content distribution test. Because attribution unit 220 has access to the test group to ID mapping, which is securely stored locally, attribution unit 220 can consistently attribute UI event data 214 to the test group across multiple login sessions.

Figure 3A:
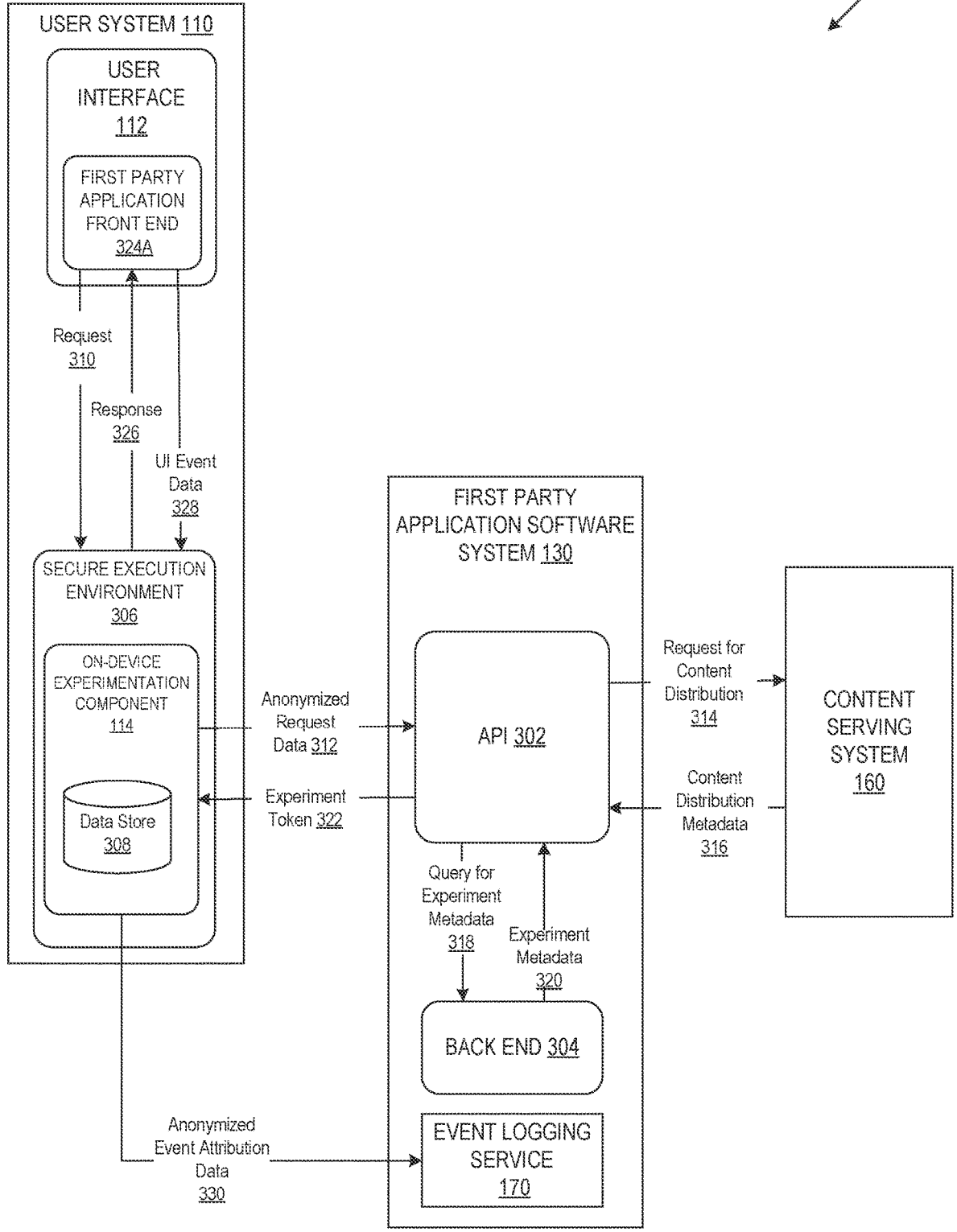
FIG. 3A is a flow diagram of an example method 300A to implement on-device experimentation in accordance with some embodiments of the present disclosure.

FIG. 3A is a flow diagram of an example method 300A to implement on-device experimentation in accordance with some embodiments of the present disclosure.

The method 300A is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300A is performed by the on-device experimentation component 114, 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 3A, user system 110 is running a first party application and a first party application front end 324A is displayed in user interface 112. In this example, on-device experimentation component 114 is installed locally on user system 110. A server-side portion of first party application software system 130 includes API (application program interface) 302 and back end 304. In the illustrated embodiment, the server-side portion of first party application software system 130 also includes event logging service 170. In other embodiments, event logging service 170 may be implemented as a service that is external to first party application software system 130.

When the first party application front end 324A issues a content distribution request 310, secure execution environment 306 is created. Request 310 is pre-processed by on-device experimentation component 114 within secure execution environment 306, which is local to user system 110. For example, an identifier is extracted from request 310 and stored in data store 308 of secure execution environment 306. The identifier is anonymized. For instance, a secure hash algorithm is applied to a combination of the identifier and a salt to generate an anonymized identifier. Secure execution environment 306 is isolated from other services, processes, applications, and systems by execution context and access control measures such as access control lists (ACLs) and/or a library pending PSOH (product security office hours).

On-device experimentation component 114 provides anonymized request data 312 to API (application program interface) 302 of first party application software system 130. In response to the anonymized request data 312, API 302 sends a request for a content distribution 314 to content serving system 160. Content serving system 160 sends content distribution metadata 316 to API 302 in response to the request 314. API 302 also sends a query to back end 304 to retrieve experiment metadata 318. Back end 304 provides experiment metadata 320 to API 302. API 302 generates an experiment token 322 based on the content distribution metadata 316, the experiment metadata 320, the anonymized identifier, and a salt.

The experiment token 322 indicates that the content distribution is associated with a content distribution test, indicates the test type (e.g., A/B test or lift test) and indicates the test groups associated with the content distribution test. The experiment token 322 is cryptographic in some embodiments. For example, a hash function such as an SHA (secure hash algorithm) is applied to a combination of the content distribution metadata, the experiment metadata, the anonymized identifier, and a salt, to generate experiment token 322.

Experiment metadata 320 and the experiment token 322 are stored in a lightweight data store within secure execution environment 306. An example of a data structure for storing the experiment metadata and experiment token is shown in Table 1 below.

TABLE 1

Data structure.

| Field | Type | Description | Data Size (Bytes) |
|---|---|---|---|
| Experiment ID | Integer | Identifier | 8 |
| Experiment Type | Integer | 0: A/B test<br>1: Lift test | 4 |
| Experiment Variant | Integer | 0: Control<br>1: Treatment | 4 |
| Experiment Token | String | Secure Hash | 32 |

Table 1 shows one possible configuration of a data structure for storing experiment metadata and an experiment token; many other configurations are possible.

In some embodiments, API 302 appends the experiment token to a digital content item supplied by content serving system 160 and forwards the combination of the digital content item and appended experiment token to on-device experimentation component 114.

On-device experimentation component 114 determines whether to display or not display the digital content item in a slot of first party application front end 324A based on the experiment token 322, and sends a response 326 to the request 310 to first party application front end 324A. Response 326 includes, for example, the digital content item or a link to the digital content item.

When a user feedback signal is generated at first party application front end 324A based on response 326, first party application front end 324A generates UI event data 328. UI event data 328 is received into secure execution environment 306 and processed by on-device experimentation component 114. On-device experimentation component 114 transforms UI event data 328 into anonymized event attribution data 330 and provides anonymized event attribution data 330 to event logging service 170.

FIG. 3B is a flow diagram of an example method 300B to implement on-device experimentation in accordance with some embodiments of the present disclosure.

The method 300B is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300B is performed by the on-device experimentation component 114 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3B is similar to FIG. 3A, except that the request 310 is generated by a third party application front end 324B. The third party application front end 324B may not be configured to generate a secure execution environment in which to run on-device experimentation component 114. Instead, on-device experimentation component 114 is included within a first party application secure execution environment 306A. First party application secure execution environment 306A is, for example, a software development kit (SDK) of first party application software system 130.

Figure 3C:
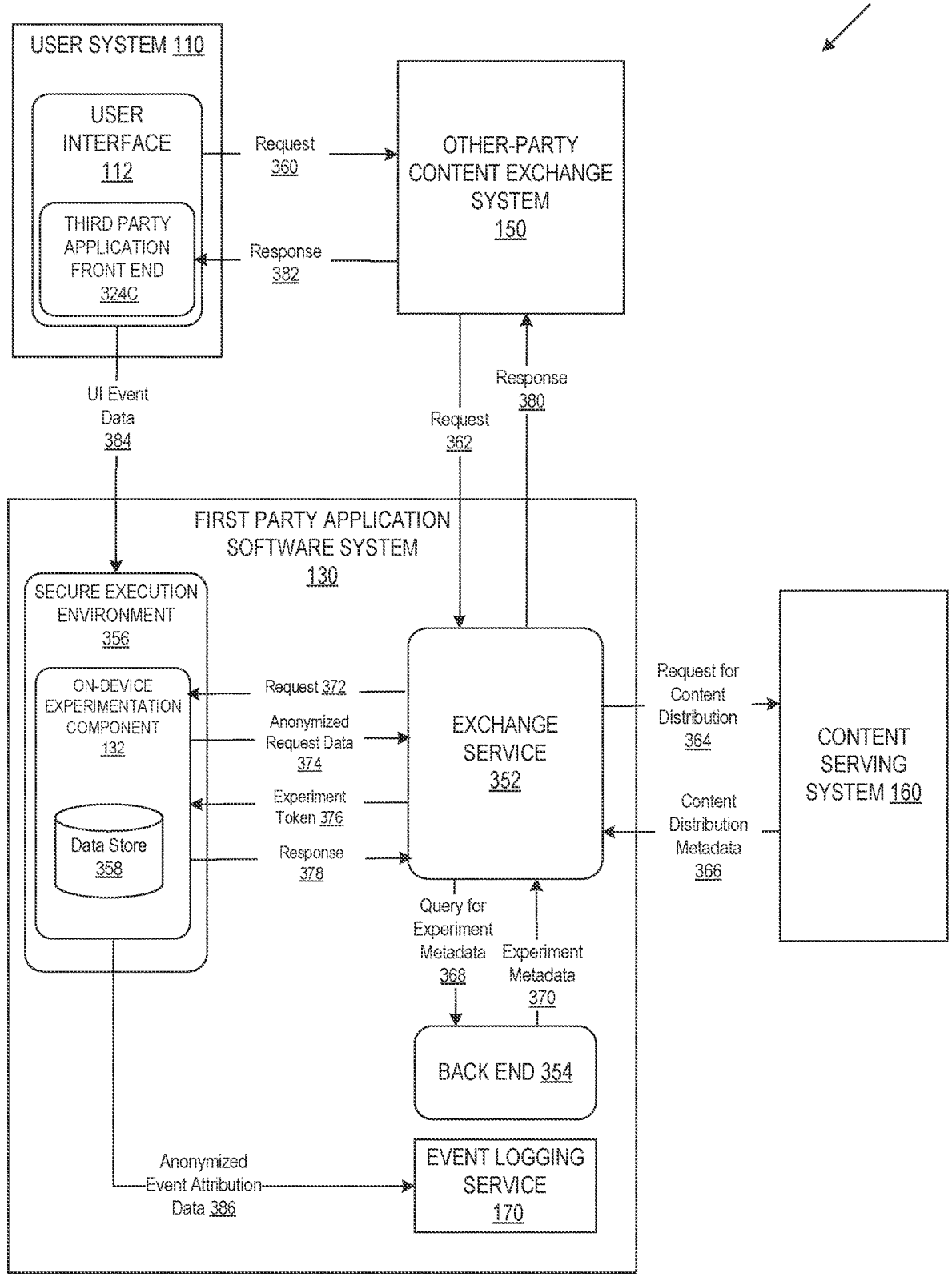
FIG. 3C is a flow diagram of an example method 300C to implement on-device experimentation in accordance with some embodiments of the present disclosure.

FIG. 3C is a flow diagram of an example method 300C to implement on-device experimentation in accordance with some embodiments of the present disclosure.

The method 300C is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300C is performed by the on-device experimentation component 114, 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 3C, user system 110 is running a third party application front end 324C, which is displayed in user interface 112. Instead of issuing requests to first party application software system 130 directly or through an SDK, third party application front end 324C communicates a request 360 through an other-party content exchange system 150. Other-party content exchange system 150 adds metadata to request 360 and communicates request 362 to exchange service 352 of first party application software system 130.

Exchange service 352 creates secure execution environment 356. For example, secure execution environment 356 is created as a virtual device, such as an ephemeral instance in which on-device experimentation component 132 is executed. In this example, on-device experimentation component 132 is created on the server side of first party application software system 130 instead of locally on user system 110.

Exchange service 352 communicates request 362 to on-device experimentation component 132 as request 372. Request 372 is pre-processed by on-device experimentation component 132 within secure execution environment 356. For example, an identifier is extracted from request 372 and stored in secure data store 358 of secure execution environment 356. The identifier is anonymized. For instance, a secure hash algorithm is applied to a combination of the identifier and a salt to generate an anonymized identifier. Secure execution environment 356 is isolated from other services, processes, applications, and systems by execution context and access control measures such as access control lists (ACLs) and/or a library pending PSOH (product security office hours).

On-device experimentation component 132 provides anonymized request data 374 to exchange service 352 of first party application software system 130. In response to the anonymized request data 374, exchange service 352 sends a request for a content distribution 364 to content serving system 160. Content serving system 160 sends content distribution metadata 366 to exchange service 352 in response to the request 364. Exchange service 352 also sends a query to back end 354 to retrieve experiment metadata 368. Back end 354 provides experiment metadata 370 to exchange service 352. Exchange service 352 generates an experiment token 376 based on the content distribution metadata 366, the experiment metadata 370, the anonymized identifier, and a salt.

The experiment token 376 indicates that the content distribution is associated with a content distribution test, indicates the test type (e.g., A/B test or lift test) and indicates the test groups associated with the content distribution test. The experiment token 376 is cryptographic in some embodiments. For example, a hash function such as an SHA (secure hash algorithm) is applied to a combination of the content distribution metadata, the experiment metadata, the anonymized identifier, and a salt, to generate experiment token 376.

Experiment metadata 370 and the experiment token 376 are stored in a lightweight data store within secure execution environment 356. An example of a data structure for storing the experiment metadata and experiment token is shown in Table 1 above.

In some embodiments, exchange service 352 appends the experiment token to a digital content item supplied by content serving system 160 and forwards the combination of the digital content item and appended experiment token to on-device experimentation component 132.

On-device experimentation component 132 determines whether to display or not display the digital content item in a slot of third party application front end 324C based on the experiment token 376, and sends a response 378 to the request 372 to exchange service 352. Response 378 includes, for example, the digital content item or a link to the digital content item. Response 378 is communicated by exchange service 352 to other-party content exchange system 150 as response 380. Other-party content exchange system 150 communicates response 380 to third party application front end 324C as response 382.

When a user feedback signal is generated at third party application front end 324C based on response 382, third party application front end 324C generates UI event data 384. UI event data 384 is received into secure execution environment 356 and processed by on-device experimentation component 132. On-device experimentation component 132 transforms UI event data 384 into anonymized event attribution data 386 and provides anonymized event attribution data 386 to event logging service 170.

FIG. 4 is a flow diagram of an example method 400 for on-device experimentation in accordance with some embodiments of the present disclosure.

The method 400 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the on-device experimentation component 114, 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing device receives a content distribution request that includes an identifier. At operation 404, the processing device determines whether a secure environment already exists for the identifier received at operation 402. A secure environment may already exist for the identifier if a content distribution request has already been received at least once previously for the same identifier.

If the processing device determines at operation 404 that a secure environment does not already exist for the identifier, the processing device creates a secure environment for the identifier at operation 406. To create a secure environment, the processing device creates an ephemeral instance, in some embodiments.

Following a determination by operation 404 that a secure environment already exists or completion of operation 406, the processing device performs operations 408, 410, 414, 416, 418, 420 in the secure environment. The processing device removes the identifier from the request at operation 408. The processing device stores the identifier in, for example, a lightweight data store within the secure execution environment. In some embodiments, the processing device anonymizes the identifier. For instance, the processing device applies a cryptographic hash function to the identifier to produce an anonymized identifier.

At operation 410, the processing device determines whether the content distribution request is part of an experiment (e.g., an A/B test or a lift test). For example, the processing device content distribution metadata indicating that the content distribution is part of a content distribution test. If the processing device determines at operation 410 that the content distribution is not part of an experiment, the method 400 ends at 412 and/or returns to operation 402 and awaits receipt of another content distribution request. When, at operation 410, the processing device determines that the content distribution is part of an experiment, the processing device proceeds to operation 414.

At operation 414, the processing device determine experiment metadata. For example, the processing device obtains experiment metadata that indicates the experiment type (e.g., A/B test or lift test), and the test group definitions for the experiment (e.g., treatment, control).

At operation 416, the processing device assign the identifier to a test group in accordance with the experiment metadata obtained at operation 414. For example, the identifier is assigned to a treatment group or to a control group, where, in some embodiments, the treatment group and the control group are mutually exclusive. In other embodiments, the treatment group and the control group are not mutually exclusive.

At operation 418, the processing device determines whether to show/not show a particular content item to user system based on the experiment metadata obtained at operation 414 and the test group assigned at operation 416. For example, operation 418 determines whether the test group assigned at operation 416 corresponds to a test group contained in the experiment metadata obtained at operation 414. In some embodiments, operations 408, 410, 414, 416, and 418 are performed by randomization unit 218 as described above.

At operation 420, the processing device adds test group data determined at operation 416, but not the identifier received at operation 402, to user interface event data and logs the user interface event data. In some embodiments, operation 420 is performed by attribution unit 220 as described above. After operation 420, the attributed user interface data is available for further processing, such as aggregation and computation of performance measurements.

Figure 5:
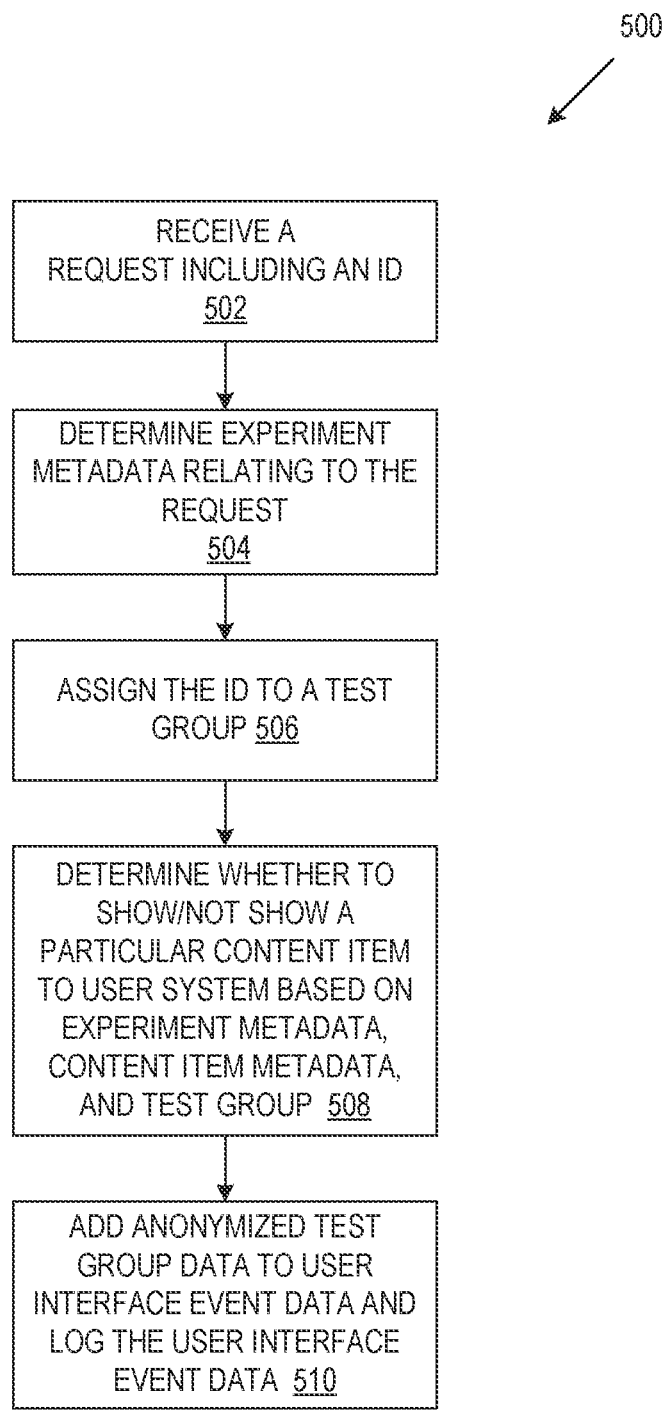
FIG. 5 is a flow diagram of an example method 500 for on-device experimentation in accordance with some embodiments of the present disclosure.

FIG. 5 is a flow diagram of an example method 500 for on-device experimentation in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the on-device experimentation component 114, 132 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device receives a request including an identifier. For example, the processing device receives the request from a front end of an application software system or from a content exchange system. In some embodiments, the processing device anonymizes the identifier. In some embodiments, operation 502 is performed by randomization unit 218 as described above.

At operation 504, the processing device determines experiment metadata relating to the request. At operation 506, the processing device assigns the identifier to a test group associated with a content distribution test. For example, the processing device assigns the identifier to one of two mutually exclusive groups associated with the test. In some embodiments, operations 504 and 506 are performed by randomization unit 218 as described above.

At operation 508, the processing device determines whether to show/not show a particular content item to the user system associated with the request based on the experiment metadata and assigned test group. In some embodiments, operation 508 is performed by randomization unit 218 as described above. At operation 510, the processing device adds the test group data, but not the identifier, to user interface event data received in response to a display of a particular digital content item as part of the content distribution test, and logs the user interface event data with the appended test group data. In some embodiments, operation 510 is performed by attribution unit 220 as described above.

FIG. 6 illustrates an example machine of a computer system 600 within which a set of instructions, for causing the machine to perform any one or more of the methodologies discussed herein, can be executed. In some embodiments, the computer system 600 can correspond to a component of a networked computer system (e.g., the computer system 100 of FIG. 1) that includes, is coupled to, or utilizes a machine to execute an operating system to perform operations corresponding to the on-device experimentation component 114, 132 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 606 (e.g., flash memory, static random access memory (SRAM), etc.), an input/output system 610, and a data storage system 640, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions the on-device experimentation system when those portions of the on-device experimentation system are being executed by processing device 602. Thus, similar to the description above, on-device experimentation system is shown in dashed lines as part of instructions 612 to illustrate that, at times, portions of notification handling system 150 are executed by processing device 602. For example, when at least some portion of on-device experimentation system is embodied in instructions to cause processing device 602 to perform the method (s) described above, some of those instructions can be read into processing device 602 (e.g., into an internal cache or other memory) from main memory 604 and/or data storage system 640. However, it is not required that all of on-device experimentation system be included in instructions 612 at the same time and portions of on-device experimentation system are stored in one or more other components of computer system 600 at other times, e.g., when one or more portions of on-device experimentation system are not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented.

In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 includes a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 644 include instructions to implement functionality corresponding to an on-device experimentation component (e.g., the on-device experimentation component 114, 132 of FIG. 1).

Dashed lines are used in FIG. 6 to indicate that it is not required that the on-device experimentation system be embodied entirely in instructions 612, 614, and 644 at the same time. In one example, portions of the on-device experimentation system are embodied in instructions 644, which are read into main memory 604 as instructions 614, and portions of instructions 614 are read into processing device 602 as instructions 612 for execution. In another example, some portions of the on-device experimentation system are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods 300A, 300B, 300C, 100, 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes receiving a request to provide digital content for display in a slot of a user interface display screen of a first device; by a secure execution environment, anonymizing an identifier received with the request, determining that the request is associated with a content distribution test, assigning the anonymized identifier to a test group associated with the content distribution test, receiving user interface event data generated by the first device in response to the content distribution test, and attributing the received user interface event data to the test group; and providing an association of the user interface event data with the test group and the content distribution test to a second device different than the first device without providing the identifier or the anonymized identifier to the second device.

An example 2 includes the subject matter of example 1, further including determining, based on the identifier, that the secure execution environment needs to be created; uniquely associating the secure execution environment with the identifier; and creating an ephemeral instance of the secure execution environment. An example 3 includes the subject matter of example 1 or example 2, further including creating the secure execution environment on the first device. An example 4 includes the subject matter of any of examples 1-3, further including creating the secure execution environment on the second device or on a third device different than the first device and the second device. An example 5 includes the subject matter of any of examples 1-4, where determining that the request is associated with a content distribution test further includes: receiving content distribution metadata from a first data source outside the secure execution environment; receiving experiment metadata for the content distribution test from a second data source outside the secure execution environment; based on the content distribution metadata and the experiment metadata, associating the request with the content distribution test. An example 6 includes the subject matter of any of examples 1-5, where assigning the anonymized identifier to a test group associated with the content distribution test further includes: applying a random function to the anonymized identifier. An example 7 includes the subject matter of any of examples 1-6, further including, by the secure execution environment: based on the test group and metadata associated with a digital content item, selecting the digital content item from a group of at least two different digital content items. An example 8 includes the subject matter of any of examples 1-7, further including, by the secure execution environment: receiving a digital content item including digital content item metadata from the second device or a third device different than the first device and the second device; and based on the test group and the digital content item metadata, determining not to display the digital content item in the slot of the user interface display screen of the first device. An example 9 includes the subject matter of any of examples 1-8, further including: determining a time interval of the content distribution test; and repeating steps (i), (ii), (iii), (iv) and (v) across a plurality of different login sessions on the first device during the time interval. An example 10 includes the subject matter of any of examples 1-9, further including, by the secure execution environment: providing a set of related digital content items for display in the slot of the user interface display screen of the first device; logging, in the secure execution environment, a display of a first digital content item of the set of related digital content items in the slot of the user interface display screen of the first device; logging, in the secure execution environment, first user interface event data received from the first device in response to the display of the first digital content item; based on the logged user interface event data, determining to display a second digital content item of the set of related digital content items in the slot; logging, in the secure execution environment, second user interface event data received from the first device in response to the display of the second digital content item; and providing the first and second user interface event data to the second device without providing the identifier or the anonymized identifier to the second device. An example 11 includes the subject matter of any of examples 1-10, further including: determining, by the secure execution environment, that the content distribution test is an A/B test or a lift test; and when the content distribution test is determined to be a lift test, store the attributed user interface event data using a bloom filter-based cache of the secure execution environment.

In an example 12, a system includes at least one processor; and at least one computer memory coupled to the at least one processor, where, in response to a request to provide digital content for display in a slot of a user interface display screen, the at least one computer memory is configured according to a secure execution environment including a randomization unit to anonymize an identifier received with the request and assign the request to a test group associated with a content distribution test; and an attribution unit to receive user interface event data for the content distribution test, attribute the received user interface event data to the test group but not to the identifier or the anonymized identifier, and log the attributed user interface event data. An example 13 includes the subject matter of example 12, where the secure execution environment further includes a secure data store to store the anonymized identifier and the user interface event data. An example 14 includes the subject matter of example 12 or example 13, where the secure execution environment is created on a user computing device. An example 15 includes the subject matter of any of examples 12-14, where the secure execution environment is created in a software development kit (SDK) of a first party application software system that is accessible to a third party application software system on a user computing device. An example 16 includes the subject matter of any of examples 12-15, where the secure execution environment is created on a server computer of a first party application software system that receives the request from a third party content exchange system. An example 17 includes the subject matter of any of examples 12-16, where the secure execution environment is configured to send anonymized request data to a first party application software system, receive experiment metadata from the first party application software system, and determine the test group based on the experiment metadata. An example 18 includes the subject matter of any of examples 12-17, further including a first party application software system configured to obtain content distribution metadata from a content serving system, determine based on the content distribution metadata that a content distribution is part of a content distribution test, obtain experiment metadata for the content distribution test, formulate a cryptographic token using the experiment metadata, and provide the cryptographic token to the secure execution environment; where the attribution unit is to append the cryptographic token to the user interface event data. An example 19 includes the subject matter of any of examples 12-18, where the first party application software system is configured to annotate a digital content item with the experiment metadata. An example 20 includes the subject matter of any of examples 12-19, where the secure execution environment is configured to determine whether to provide the digital content item for display in the slot of the user interface display screen based on the test group and the experiment metadata with which the digital content item is annotated.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving a request to provide digital content for display in a slot of a user interface display screen of a first device;
   by a secure execution environment,
   (i) anonymizing an identifier received with the request,
   (ii) determining that the request is associated with a content distribution test,
   (iii) assigning the anonymized identifier to a test group associated with the content distribution test,
   (iv) receiving user interface event data generated by the first device in response to the content distribution test, and
   (v) attributing the received user interface event data to the test group; and
   providing an association of the user interface event data with the test group and the content distribution test to a second device different than the first device without providing the identifier or the anonymized identifier to the second device.

2. The method of claim 1, further comprising:
   determining, based on the identifier, that the secure execution environment needs to be created;
   uniquely associating the secure execution environment with the identifier; and
   creating an ephemeral instance of the secure execution environment.

3. The method of claim 1, further comprising:
   creating the secure execution environment on the first device.

4. The method of claim 1, further comprising:
   creating the secure execution environment on the second device or on a third device different than the first device and the second device.

5. The method of claim 1, wherein determining that the request is associated with a content distribution test further comprises:
   receiving content distribution metadata from a first data source outside the secure execution environment;
   receiving experiment metadata for the content distribution test from a second data source outside the secure execution environment;
   based on the content distribution metadata and the experiment metadata, associating the request with the content distribution test.

6. The method of claim 1, wherein assigning the anonymized identifier to a test group associated with the content distribution test further comprises:
   applying a random function to the anonymized identifier.

7. The method of claim 1, further comprising, by the secure execution environment:
   based on the test group and metadata associated with a digital content item, selecting the digital content item from a group of at least two different digital content items.

8. The method of claim 1, further comprising, by the secure execution environment:
   receiving a digital content item including digital content item metadata from the second device or a third device different than the first device and the second device; and
   based on the test group and the digital content item metadata, determining not to display the digital content item in the slot of the user interface display screen of the first device.

9. The method of claim 1, further comprising:
   determining a time interval of the content distribution test; and
   repeating steps (i), (ii), (iii), (iv) and (v) across a plurality of different login sessions on the first device during the time interval.

10. The method of claim 1, further comprising, by the secure execution environment:
    providing a set of related digital content items for display in the slot of the user interface display screen of the first device;
    logging, in the secure execution environment, a display of a first digital content item of the set of related digital content items in the slot of the user interface display screen of the first device;
    logging, in the secure execution environment, first user interface event data received from the first device in response to the display of the first digital content item;
    based on the logged user interface event data, determining to display a second digital content item of the set of related digital content items in the slot;
    logging, in the secure execution environment, second user interface event data received from the first device in response to the display of the second digital content item; and
    providing the first and second user interface event data to the second device without providing the identifier or the anonymized identifier to the second device.

11. The method of claim 1, further comprising:
    determining, by the secure execution environment, that the content distribution test is an A/B test or a lift test; and
    when the content distribution test is determined to be a lift test, store the attributed user interface event data using a bloom filter-based cache of the secure execution environment.

12. A system comprising:

at least one processor; and at least one computer memory coupled to the at least one processor;

wherein, in response to a request to provide digital content for display in a slot of a user interface display screen, the at least one computer memory is configured according to a secure execution environment, the secure execution environment comprising:

a randomization unit to anonymize an identifier received with the request and assign the request to a test group associated with a content distribution test; and an attribution unit to receive user interface event data for the content distribution test, attribute the received user interface event data to the test group but not to the identifier or the anonymized identifier, and log the attributed user interface event data.

13. The system of claim 12, wherein the secure execution environment further comprises a secure data store to store the anonymized identifier and the user interface event data.

14. The system of claim 12, wherein the secure execution environment is created on a user computing device.

15. The system of claim 12, wherein the secure execution environment is created in a software development kit (SDK) of a first party application software system that is accessible to a third party application software system on a user computing device.

16. The system of claim 12, wherein the secure execution environment is created on a server computer of a first party application software system that receives the request from a third party content exchange system.

17. The system of claim 12, wherein the secure execution environment is configured to send anonymized request data to a first party application software system, receive experiment metadata from the first party application software system, and determine the test group based on the experiment metadata.

18. The system of claim 12, further comprising a first party application software system configured to obtain content distribution metadata from a content serving system, determine based on the content distribution metadata that a content distribution is part of a content distribution test, obtain experiment metadata for the content distribution test, formulate a cryptographic token using the experiment metadata, and provide the cryptographic token to the secure execution environment; wherein the attribution unit is to append the cryptographic token to the user interface event data.

19. The system of claim 18, wherein the first party application software system is configured to annotate a digital content item with the experiment metadata.

20. The system of claim 19, wherein the secure execution environment is configured to determine whether to provide the digital content item for display in the slot of the user interface display screen based on the test group and the experiment metadata with which the digital content item is annotated.

* * * * *